US008917002B2

(12) United States Patent  
Frohnapfel et al.

(10) Patent No.: US 8,917,002 B2
(45) Date of Patent: Dec. 23, 2014

(54) ELECTRIC MACHINE HAVING A PLURALITY OF TORQUE-SUPPORT ELEMENTS

(75) Inventors: Michael Frohnapfel, Fulda (DE); Klaus Georg, Salz (DE); Markus Stephan Haschka, Nürnberg (DE); Sebastian Waider, Petersberg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/301,089

(22) Filed: Nov. 21, 2011

(65) Prior Publication Data

US 2012/0293030 A1    Nov. 22, 2012

(30) Foreign Application Priority Data

Nov. 22, 2010   (EP) .................................. 10014824

(51) Int. Cl.
- *H02K 5/00* (2006.01)
- *H02K 5/24* (2006.01)
- *F16M 5/00* (2006.01)
- *F16M 13/00* (2006.01)
- *H02K 5/15* (2006.01)
- *H02K 1/18* (2006.01)

(52) U.S. Cl.
CPC ................. *H02K 1/185* (2013.01); *H02K 5/24* (2013.01); *H02K 5/15* (2013.01)
USPC ................ 310/91; 310/51; 248/637; 248/595

(58) Field of Classification Search
CPC .................................. H02K 5/00; F16M 5/00
USPC .............. 310/91, 216.081, 216.083–216.859, 310/216.124, 216.129, 272, 427, 431, 408, 310/411, 413, 51; 248/300, 646, 661, 664, 248/559, 637
See application file for complete search history.

(56) References Cited

U.S. PATENT DOCUMENTS

| | | | | |
|---|---|---|---|---|
| 4,076,196 A | * | 2/1978 | Levine | 248/675 |
| 4,386,270 A | * | 5/1983 | Ezekiel | 250/231.13 |
| 5,537,810 A | * | 7/1996 | Paweletz | 57/406 |
| 6,107,705 A | * | 8/2000 | Durantay et al. | 310/51 |

(Continued)

FOREIGN PATENT DOCUMENTS

DE    10 2005 050 772 A1    4/2007
EP         0 860 932 A1    8/1998

(Continued)

OTHER PUBLICATIONS

Machine Translation JP2001317934 (2001).*
Machine Translation JP2009219278 (2009).*

* cited by examiner

*Primary Examiner* — Tran Nguyen
*Assistant Examiner* — Jose Gonzalez Quinones
(74) *Attorney, Agent, or Firm* — Henry M. Feiereisen LLC

(57) ABSTRACT

An electric machine for installation to a retaining device includes a stator having an axis, and a torque-support device for supporting the stator against the retaining device to prevent a turning movement around the axis. The torque-support device has an intermediate element, at least two holding support elements for providing support against the retaining device, and at least two stator support elements for providing support against the stator. The holding support elements and the stator support elements possess each a greater rigidity in a circumferential direction in relation to the axis than in any other spatial direction.

9 Claims, 5 Drawing Sheets

(56) References Cited

U.S. PATENT DOCUMENTS

| | | | |
|---|---|---|---|
| 6,557,816 B2 * | 5/2003 | Yoshida | 248/674 |
| 2002/0063494 A1 * | 5/2002 | Yoshikawa et al. | 310/261 |
| 2004/0079177 A1 * | 4/2004 | Mutschler et al. | 73/865.9 |
| 2011/0025155 A1 * | 2/2011 | Kurosawa et al. | 310/91 |

FOREIGN PATENT DOCUMENTS

| | | | |
|---|---|---|---|
| EP | 1 489 726 A2 | | 12/2004 |
| EP | 1 729 399 A2 | | 12/2006 |
| GB | 2 169 754 A | | 7/1986 |
| JP | 2001317934 A | * | 11/2001 |
| JP | 2003247572 A | * | 9/2003 |
| JP | 2009219278 A | * | 9/2009 |

FIG 3
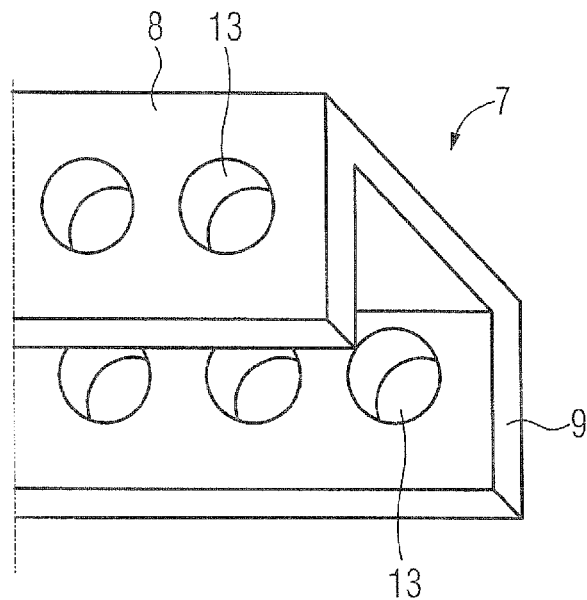
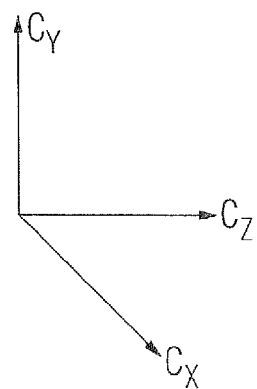
FIG 4
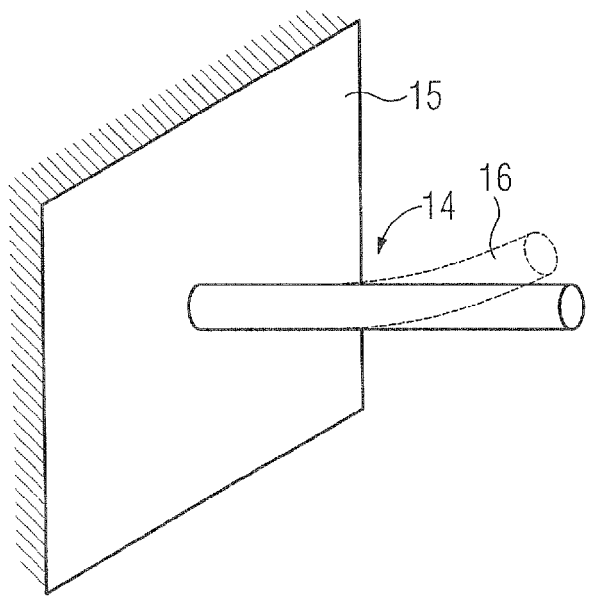
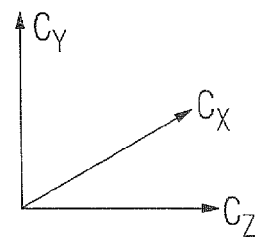

ELECTRIC MACHINE HAVING A PLURALITY OF TORQUE-SUPPORT ELEMENTS

CROSS-REFERENCES TO RELATED APPLICATIONS

This application claims the priority of European Patent Application, Serial No. EP 10014824, filed Nov. 22, 2010, pursuant to 35 U.S.C. 119(a)-(d), the content of which is incorporated herein by reference in its entirety as if fully set forth herein.

BACKGROUND OF THE INVENTION

The present invention relates to an electric machine that can be mounted in or on a retaining device, for example a machine frame.

The following discussion of related art is provided to assist the reader in understanding the advantages of the invention, and is not to be construed as an admission that this related art is prior art to this invention.

If, for example, a torque motor is to drive a separately mounted work machine without a coupling connection on the shaft side, then over-determined bearing will occur. Over-determined bearing of such kind can be successfully avoided by using torque supports that absorb the stator's reaction torque and duct it into the machine frame. The stator is otherwise linked to the machine only via the motor bearings. The bearings absorb the motor's static forces. The torque support absorbs only the counter-torque to prevent the stator from speeding up under the influence of said counter-torque.

It has hitherto been customary to use single-arm torque supports which, while ensuring a low degree of rigidity in the three translational axes, are far more rigid for rotations. A force whose counter-forces will have a damaging impact on the motor bearings will hence be transmitted at the securing point between the torque support and machine frame. Especially the motor bearing closest to the motor support will absorb the greatest portion of said force. That design also has further disadvantages for controlled dynamic operation because types of vibration that are not pure torsion vibrations will also be induced in that way by the counter-forces.

Another disadvantage of the single-arm torque support is its lack of potential to achieve a greater degree of torsional rigidity. Finite-element simulations have shown that even ideally stiffening individual elements (wobble stick, motor bearing, stator housing) will produce only a slight increase in torsional rigidity. That characteristic can be explained by the vibration pattern occurring in the case of a single-arm torque support. When resonance occurs it is not just the rigid stator that vibrates via the elastic wobble stick on the torque support but also the two motor bearings and the motor shaft. Moreover a twisting of the stator housing is even discernible. The effectively acting torsional rigidity therefore acts like a plurality of springs connected one behind the other, the overall effect of which is an ever-reducing rigidity.

It would therefore be desirable and advantageous to provide an improved electric machine to obviate prior art shortcomings and to keep introduction of reaction forces into the motor bearings during operation to a minimum.

SUMMARY OF THE INVENTION

According to one aspect of the present invention, an electric machine for installation to a retaining device includes a stator having an axis, and a torque-support device for supporting the stator against the retaining device to prevent a turning movement around the axis, said torque-support device having an intermediate element, at least two holding support elements for providing support against the retaining device, and at least two stator support elements for providing support against the stator, wherein the holding support elements and the stator support elements possess each a greater rigidity in a circumferential direction in relation to the axis than in any other spatial direction.

Thanks to the thus designed torque-support device it is in that way advantageously possible for no additional excessive rigidity to be produced on the stator side in the three translational spatial directions as that would cause damage to the bearings were the shaft to run untrue because the motor bearings or, as the case may be, the electric machine's bearings would have to absorb large counter-forces. In particular the holding support elements and stator support elements can be designed such as to exhibit very little rigidity in the three translational axes and very high rotational rigidity as regards the motor's axis of rotation.

According to another advantageous feature of the present invention, a housing can be provided, with the stator support elements being supported on the stator via the housing. The stator can hence be surrounded by a housing (for example a motor housing) and the torque-support device will be supported not directly against the stator but indirectly against the stator via the housing.

According to another advantageous feature of the present invention, the stator can have an end shield, with the stator support elements supported directly on the end shield. The invention can hence be employed also for motors without a housing.

According to another advantageous feature of the present invention, the stator support elements and the holding support elements can each be designed of rod-shaped configuration. Rods of such kind exhibit a very high degree of rigidity in their axial direction while displaying less rigidity in each axially transverse direction. As throughout the document, rigidity is in the case of a support element therein referred to a point on the support element at which it is secured to the intermediate element as opposed to a point on the support element at which it is joined to the stator, housing, or retaining device (rigidity in flexure or compressive rigidity).

According to another advantageous feature of the present invention, the stator support elements and the holding support elements can each have a U-shaped cross section or V-shaped cross-section. Here, too, there is as a rule a significantly greater rigidity perpendicular to the cross-section (compressive rigidity) than in a direction perpendicular thereto (rigidity in flexure).

According to another advantageous feature of the present invention, the stator support elements and holding support elements can possess a greater rigidity in the circumferential direction clockwise or anticlockwise than in any other direction. A very high degree of rigidity can hence be ensured in the circumferential direction whereas a lesser degree of rigidity can be achieved in all other directions in particular in terms of translational movements of the stator relative to the retaining device.

According to another advantageous feature of the present invention, the stator support elements and the holding support elements can respectively be arranged symmetrically to one another in relation to the axis. A greater degree of torsional rigidity can be achieved thereby than with single-arm torque supports.

According to another advantageous feature of the present invention, the stator support elements can be arranged on a first plane which extends through the axis, and the holding support elements can be arranged on a second plane which extends through the axis, with the first plane oriented perpendicular to the second plane. It is then possible, if the support elements are all structurally identical, to achieve equal rigidity or, as the case may be, flexibility for support elements in both planes.

According to another advantageous feature of the present invention, the intermediate element may be configured of annular shape. It is therefore possible to transmit in particular torsional forces with a high level of rigidity; and moreover the shaft of the electric machine, for example the rotor shaft, can project outwardly through the intermediate element.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a basic illustration of an implementation variant of the rectangular U profile as shown in FIG. 2;

FIG. 4 is a basic illustration of a rod-shaped support element;

DETAILED DESCRIPTION OF PREFERRED EMBODIMENTS

Figure 1:
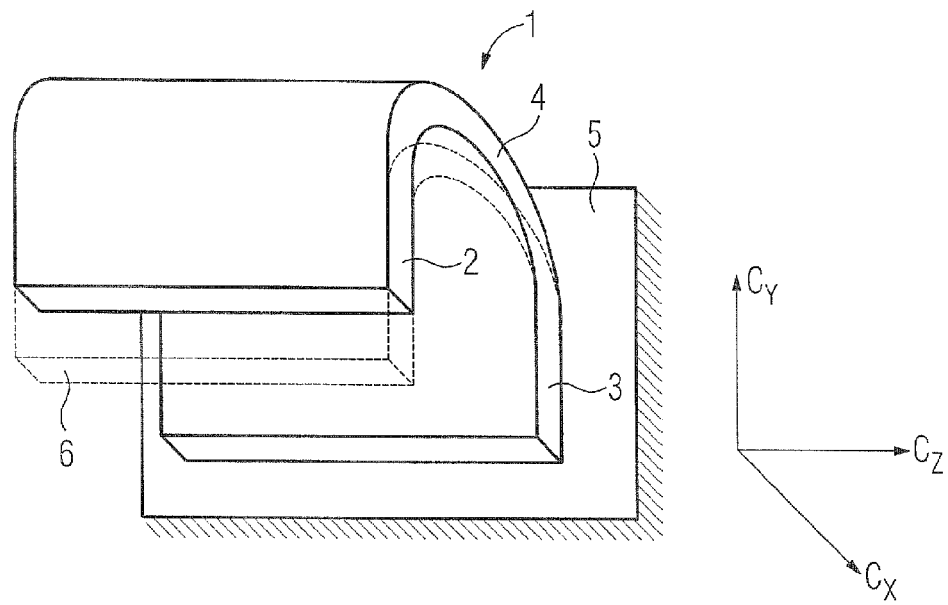
FIG. 1 is a basic illustration of a support element having a round U profile.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The present invention is based on the notion of constructing a torque-support device such that as great as possible rotational rigidity will occur around the motor's axis of rotation and as little and as possible translational rigidity will occur with respect to the stator. What are suitable for achieving the relevant objective are structural elements whose rigidity $C_x$, $C_y$, $C_z$ differs greatly in the three spatial axes x, y, z (referred to here also as spatial directions). The support element employed for the torque-support device is ideally flexible in two directions and rigid in one spatial axis. A possible support element 1 is shown in FIG. 1. Support element 1 has a U-shaped cross-section and in particular two limbs 2 and 3 that are joined to a round section 4. Each of the two limbs 2, 3 is permanently joined to either a supported or a supporting element. Only the securing of limb 3 to, for example, supported element 5 is shown in FIG. 1. Said supported element 5 can be, for example, the intermediate element shown in FIG. 5.

Support element 1 is shown in a displaced or, as the case may be, bent condition in FIG. 1. Force-free condition 6 is shown with a dashed outline. Limb 2 has thus been displaced in the y direction relative to limb 3 in the example, with the two limbs 2 and 3 each extending in a y-z plane.

What applies, for example, as regards rigidities $C_x$, $C_y$, and $C_z$ of support element 1 shown in FIG. 1 is that $C_x \ll C_z$ and $C_y \ll C_z$. The support element is thus substantially more flexible in particular in directions x and y (and of course also in their opposite direction) than in direction z.

Figure 2:
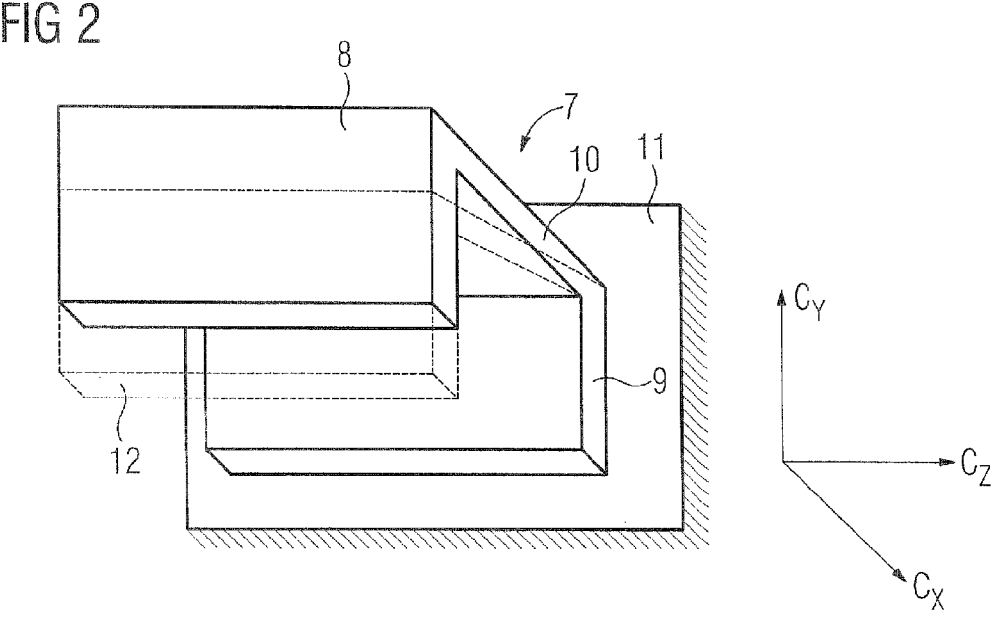
FIG. 2 is a basic illustration of a support element having a rectangular U profile.

A U-shaped support element 7 is shown likewise in FIG. 2. It has a rectangular cross-section, meaning that its two limbs 8 and 9 are joined together by a section 10 extending perpendicular thereto (assuming a force-free condition). What applies in particular in that example is that $C_y \ll C_z$. As in the example shown in FIG. 1, limb 9 is here, too, secured to a section 11 of a supported element and limb 8 has been displaced in the y direction relative to force-free condition 12 (drawn with a dashed outline). That means that support element 7 will be able to compensate vibrations preferably in the y direction.

FIG. 3 shows a specific instance of a support element 7 of such kind having a rectangular U profile. The "profile" extends for the desired length in the z direction. In both limbs 8 and 9 it has holes 13 for being secured to the supporting or, as the case may be, supported element.

FIG. 4 shows another support element 14 having a very different rigidity in the three axes x, y, and z. In this case it is a rod which at its ends is clamped on the one hand into the supporting element and on the other into the supported element. Shown in the instance given in FIG. 4, again by way of example, is a section 15 of the supported element. The rod (in particular a round rod) is therefore a bending rod which is clamped into place preferably on one side only and can be bent so that its free end will assume position 16, for example (drawn with a dashed outline), under the impact of a force. The rigidity in flexure $C_x$, $C_y$ in directions or on axes x and y is substantially less than the compressive rigidity $C_z$ in the z direction. That means that $C_x \ll C_z$ and $C_y \ll C_z$. The bending rod will therefore be flexible in the bending direction if the length is sufficient and rigid in the pulling or pushing direction. In the torque-support device, the support elements that are employed are to be spatially arranged such that their high degree of flexibility can be utilized for any displacements of the motor housing or, as the case may be, stator in translational axis directions and their high degree of rigidity will be of practical benefit in the presence of torque-induced rotational loading. That is done by, for example, arranging a total of four support elements in two planes mutually turned through 90° according to the examples shown in FIG. 5 to FIG. 7.

A plurality of design principles are basically conceivable. For example the support elements can be arranged in two axially mutually separated parallel planes (see FIGS. 5 and 6). The support elements can furthermore also be arranged partially radially one above the other in a single plane. The motor support device can moreover also be arranged axially in front of the motor or electric machine, or else, for example, radially above the motor.

Figure 5:
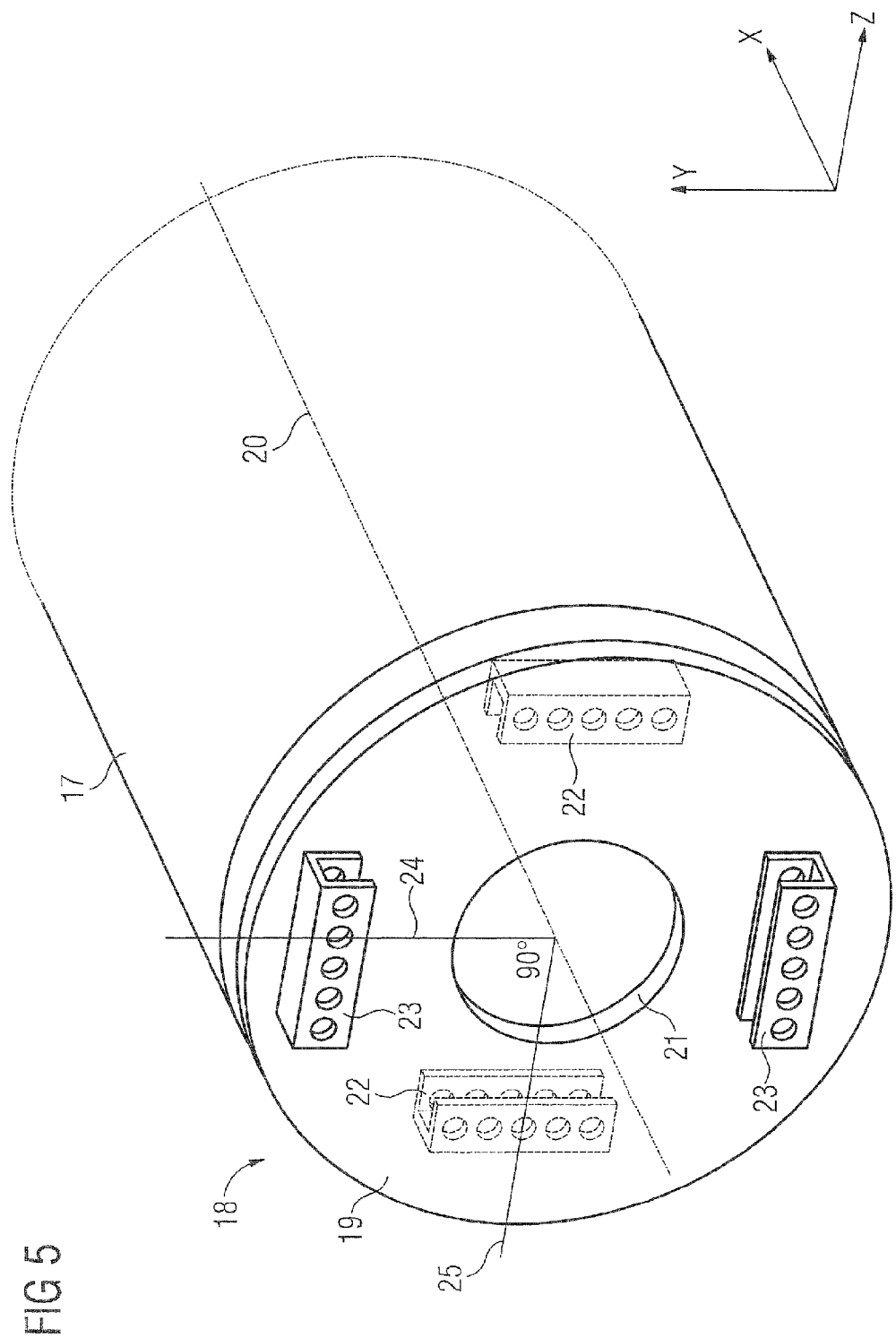
FIG. 5 is a perspective illustration of a motor having a torque-support device based on support elements as shown in FIG. 3.

The electric machine shown in the example in FIG. 5 has a stator 17 and a torque-support device 18. The torque-support device 18 has an intermediate element 19 which is here embodied as annular in shape and is arranged coaxially relative to the stator's axis 20. If there is a rotor in stator 17, its shaft can project through opening 21 of intermediate element 19.

Stator support elements 22 are arranged in a first plane parallel to intermediate element 19. Said first plane is located between intermediate element 19 and stator 17. Stator support elements 22 join stator 17 and intermediate element 19.

Located in a second plane, likewise perpendicular to axis of rotation 20, in front of intermediate element 19, which is to say on the side of intermediate element 19 facing away from stator 17, are holding support elements 23. (If elements are referred to in the present document as being located on the same plane, it means their centers of gravity are located on one plane.) Holding support elements 23 are secured to the intermediate element axially opposite each other (as are likewise stator support elements 22). Holding support elements 23 will otherwise be secured to a retaining device not shown in FIG. 5. That can be, for example, the frame of a machine or suchlike.

The torque-support device therefore here includes four support elements 22, 23 arranged in two planes mutually turned through 90° perpendicular to the axis. The two planes are located axially in front of and behind intermediate element 19 and have been "turned" through 90°, which is indicated by the two lines 24 and 25. That means that the centers of gravity of stator support elements 22 are located on a first plane extending through axis 20 and the two holding support elements 23 are located in a second plane likewise extending through axis 20, with the first plane and second plane being disposed perpendicularly one upon the other.

The consequence of this specific arrangement of support elements 22, 23 is that vibrations in the z direction will here be decoupled by stator support elements 22 (see FIG. 2) and vibrations in the y direction by holding support elements 23. Virtually all vibrations will conversely be transmitted unattenuated by stator support elements 22 in the y direction and holding support elements 23 in the z direction owing to their high degree of rigidity in this regard.

Figure 6:
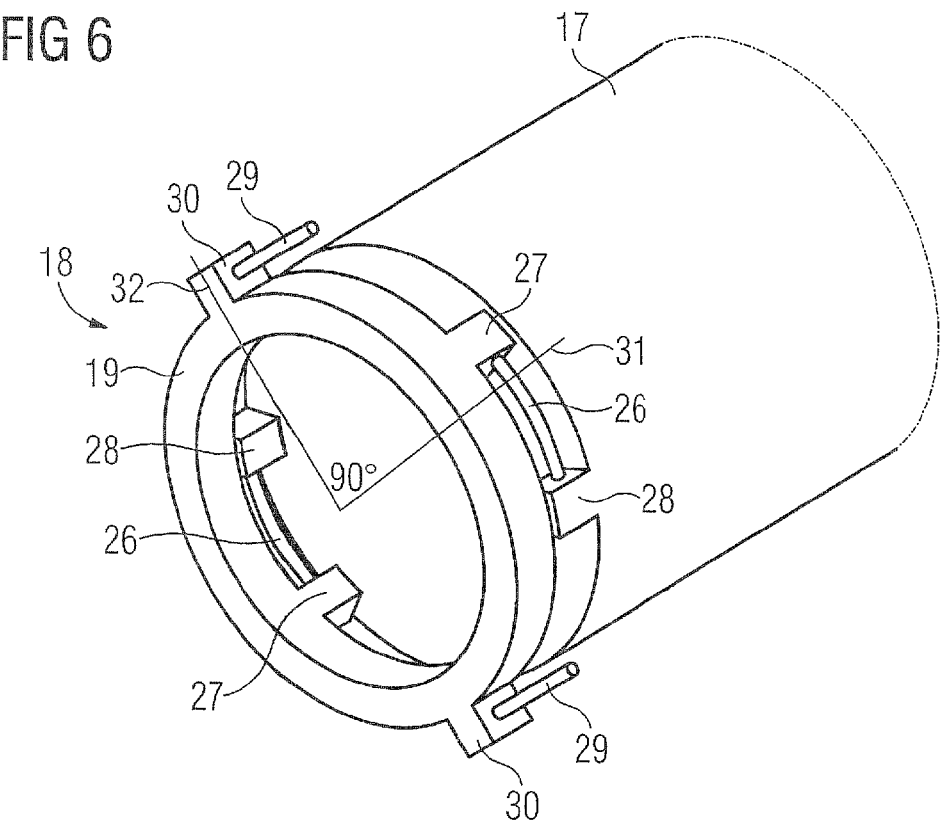
FIG. 6 is a perspective illustration of a motor having a torque-support device based on support elements as shown in FIG. 4.

FIG. 6 shows a variant of an inventive electric machine. Arranged here axially in front of stator 17 is a torque-support device 18 that has support elements as shown in FIG. 4, namely rod-shaped support elements. Intermediate element 19 is annular in shape here, too. Located on one plane axially between stator 17 and intermediate element 19 are rod-shaped stator support elements 26. They are supported on the one hand on projections 27 belonging to intermediate element 19 and, on the other, on projections 28 belonging to stator 17. Stator support elements 26 extend substantially in the circumferential direction of stator 27 or, as the case may be, annular intermediate element 19.

Located in a second plane, across which intermediate element 19 here also extends, are holding support elements 29, here likewise embodied as being rod-shaped. They are each supported on projections 30 here projecting radially outwardly from intermediate element 19. Conversely, projections 27 and 28 extend—as far as the respective central support point is concerned—substantially in an axial direction so that respective stator support elements 26 extend within the diameter of annular intermediate element 19. Holding support elements 29 are by contrast located outside the circumference of intermediate element 19. The two planes in which stator support elements 26 on the one hand and holding support elements 29 on the other are located have as in the example shown in FIG. 5 been turned through 90°, which is indicated by lines 31 and 32.

Figure 7:
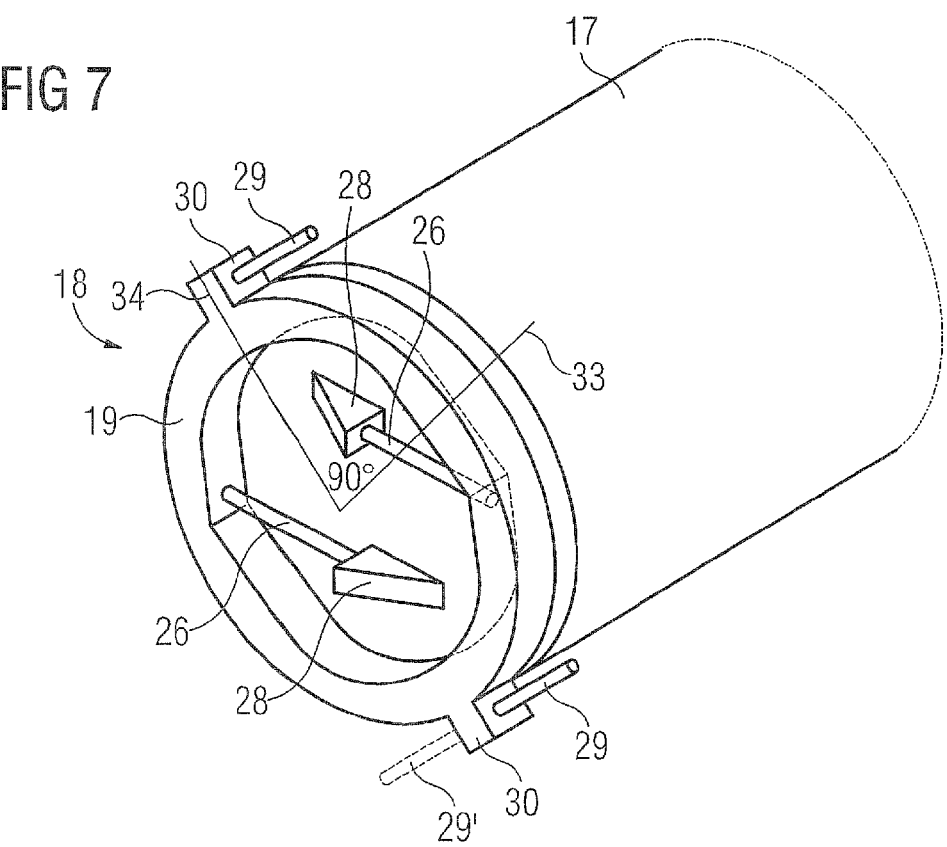
FIG. 7 is a perspective illustration of a motor having a different motor support device based on support elements as shown in FIG. 4.
Figure 8:
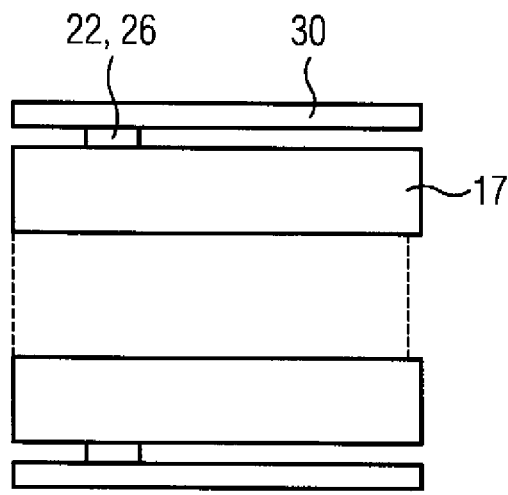
FIG. 8 shows the stator support elements 22, 26 supported on the stator 17 via the housing 30.
Figure 9:
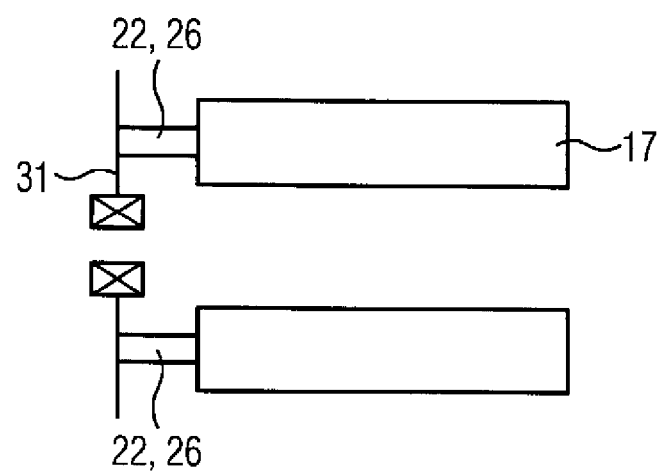
FIG. 9 shows the stator support elements 22, 26 supported directly on the end shield 31.

FIG. 7 shows another variant of an electric machine having a stator 17 and torque-support device 18. Intermediate element 19 is embodied here, too, as annular in shape and is located axially in front of stator 17. Rod-shaped holding support elements 29 are likewise located on projections 30 which project radially outwardly from intermediate element 19. Stator support elements 26 are located on the same plane perpendicular to the axis of stator 17. They are here located radially inside intermediate element 19. If consideration is given here, too, to a first plane through the axis of stator 17 and the centers of gravity of stator support elements 26 and to a second plane through the axis of stator 17 and the centers of gravity of holding support elements 29, then said two planes are also disposed one upon the other turned through 90°, which is indicated by lines 33 and 34. Projections 28 of stator 17 here project inside intermediate element 19 so that the entire electric machine can here be constructed axially shorter than in the example shown in FIG. 6.

One of holding support elements 29 here projects clockwise and the other holding support element 29 projects counterclockwise out of respective projection 30. That means that one holding support element 29 will be subjected to a pulling force and the other to a pushing force during torque transmission. Both holding support elements can alternatively also project out of respective projections 30 in the same direction (see holding support element 29' drawn with a dashed outline).

Intermediate element 19 should be embodied as being as light as possible to raise its natural frequency. In conflict with the objective it ought, though, also to be as rigid as possible to prevent the reduction in its torsional rigidity as the third spring in the series-connected arrangement of the torsion springs.

The torque supports (which is to say the torque-support devices) implemented using the above proposed structural designs possess a low degree of rigidity in the three translational spatial axes, which reduces the load on the motor bearings. Additional bearing forces will always result when a shaft that is to be driven by the motor is not ideally aligned when mounted, but because the rigidity in the translational axes is very low it follows that the restoring force corresponding thereto is also significantly lower since the stator can yield to it.

Another advantage is the torque support's symmetric structural design, because of which no forms of vibrating or resonances that are not unavoidable, pure torsional vibrations will be induced in the machine by the transmitted forces in the torque support. That property is very advantageous for highly dynamic regulating because absorber/resonance pairs in the frequency response of the speed-regulating path (transmission function in systems theory: Motor torque relative to speed in the frequency response range) limit maximum possible loop gain and under unfavorable conditions will even give rise to an unstable control loop. The frequency response of the speed-regulating path of a motor linked up via the above presented torque support exhibits only pure torsional vibrations. The other torsional vibrations originate in the driven shaft and, where applicable, the load. Yet further resonances would aggravatingly additionally occur in the path behavior in the case of a conventional design having just one single-arm support.

The torsional rigidity will also be greater than in the case of the classical single-arm solution owing to the torque-support device's having a symmetrical structural design. As no reaction forces will occur in the motor bearings, the bearing will not act like an additional spring in the event of resonance induced by torsional vibrations and so will not reduce the rigidity.

Another advantage over the solution having just one single-arm torque support is that any motor torque that occurs will owing to the symmetric structural design not give rise to any reaction forces in the motor bearings. Wobble sticks situated in each case mutually opposite on the torque support will therefore balance each other out in terms of force.

A translational displacement of the stator toward the work machine's axis of rotation will in the case of the hitherto employed single-arm concept give rise to a rotational relative movement of the stator toward the rotor. That rotation will be expressed in a (possibly periodically occurring) angular error/deviation in the position of the rotor and hence be another factor disrupting the regulating path.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An electric machine for installation to a retaining device, comprising;
    a stator having an axis; and
    a torque-support device for supporting the stator against the retaining device to prevent a turning movement around the axis, said torque-support device having an intermediate element with two opposite sides, at least two holding support elements for providing support against the retaining device, and at least two stator support elements for providing support against the stator,
    wherein the holding support elements and the stator support elements possess each a rigidity in a circumferential direction in relation to the axis that is greater than a rigidity in any other spatial direction,
    wherein the stator support elements and the holding support elements are respectively arranged in symmetry with one another in relation to the axis,
    wherein the stator support elements are arranged on a first plane which extends through the axis and are located on one of the opposite sides of the intermediate element and do not penetrate through the latter, and the holding elements are arranged on a second plane which extends through the axis and are located on another opposite side of the intermediate element without penetrating the intermediate element, with the first plane oriented perpendicular to the second plane.

2. The electric machine of claim. 1, further comprising a housing, said stator support elements being supported on the stator via the housing.

3. The electric machine of claim 1, wherein the stator has an end shield, said stator support elements being supported directly on the end shield.

4. The electric machine of claim 1, wherein the stator support elements and the holding support elements are each of rod-shaped configuration.

5. The electric machine of claim 1, wherein the stator support elements and the holding support elements have each a U-shaped cross section or V-shaped cross-section.

6. The electric machine of claim 1, wherein the stator support elements and holding support elements possess a rigidity in the circumferential direction clockwise or anticlockwise that is greater than a rigidity in any other direction.

7. The electric machine of claim 1, wherein the intermediate element has an annular shape.

8. The electric machine of claim 1, wherein the holding support elements are rigid and provide a rigid support against the retaining device, and the stator support element are rigid and provide a rigid support against the stator.

9. The electrical machine of claims 1, wherein two of the stator support elements are located diametrically opposite to one another, and two of the holding elements are also located diametrically opposite to the stator support elements and are offset by 90° relative to the stator support elements, and wherein the stator support element and the holding elements are U-shaped and have inner spaces which are open toward the axis.

* * * * *